Feb. 4, 1941.  J. M. CHEVALIER  2,230,676

CHOKER HOOK

Filed Feb. 12, 1940  2 Sheets-Sheet 1

INVENTOR
John M. Chevalier
BY
ATTORNEY

Feb. 4, 1941.  J. M. CHEVALIER  2,230,676
CHOKER HOOK
Filed Feb. 12, 1940  2 Sheets-Sheet 2

INVENTOR
John M. Chevalier
BY
ATTORNEY

Patented Feb. 4, 1941

2,230,676

UNITED STATES PATENT OFFICE 2,230,676

CHOKER HOOK

John M. Chevalier, Seattle, Wash.

Application February 12, 1940, Serial No. 318,470

8 Claims. (Cl. 294—74)

This invention relates to choker hooks, and is objectively directed to the provision of a hook in which the application to and removal from the same of the choker cable is accomplished with greater facility than heretofore, and especially to provide a hook in which the removal of the cable from its hooked position may be effected with a maximum of safety to the operator against the attendant "whip" of the cable end as the same is released from its constrained position.

In furtherance of the above, it may be here stated that my invention relates to that class of hook employing a fixed guard, a type of hook which, heretofore, has been confined in its use to cables fitted at their free ends with an enlarged ferrule-piece. In using hooks of this character, which is to say hooks providing a socket for a ferrule-piece, the principal objection lies in the necessity, when disengaging the hook, of manually guiding the ferrule-piece over the guard into a position whereat the same is completely free of the hook body. Considering the required proximity of the operator in this manipulative work of freeing the cable end, it will be apparent that such hooks, while functioning with considerable efficiency to the end of preventing accidental disengagement, are hazardous from the standpoint of end whip.

In attaining my object of minimizing the possibilty of the operator being endangered by the whip of a live cable while retaining, if not augmenting, the efficiency both from the standpoint of simplified operation and guarding against accidental disengagement of the hooked cable, I provide a guarded hook employing a bill adapted for use with a cable-eye rather than a ferrule-piece and so engineer the guard therefor as to momentarily restrain the cable following its full release from coupled engagement with the bill, provide, further, a hook devoid of exposed projections liable to catch on snags or the like in the path of travel of the work, and provide, still further, a hook characterized by a guiding function for most efficaciously leading the eye of the cable into its lodged position with the hook bill. These foregoing, with still further advancements peculiarly adapting my fixed-guard hook to use with a cable-eye, will become apparent in the course of the following detailed description and the claims annexed thereto.

The invention consists in the novel construction and in the adaptation and combination of parts hereinafter described and claimed.

Figure 2:
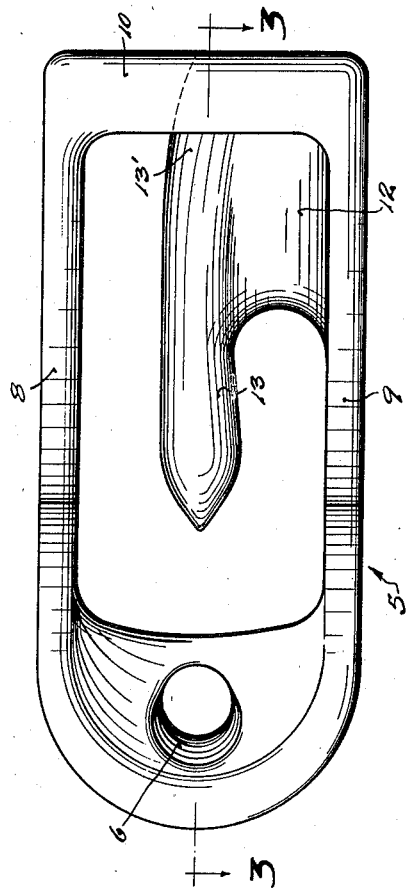
Fig. 2 is an enlarged side elevational view of the hook alone.
Figure 1:
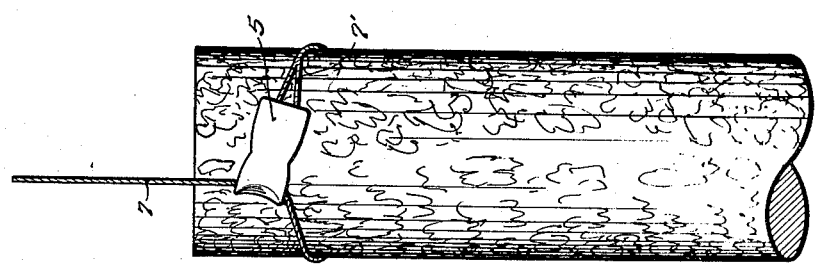
Figure 1 is a plan view illustrating the application of the invention.
Figures 3, 4:
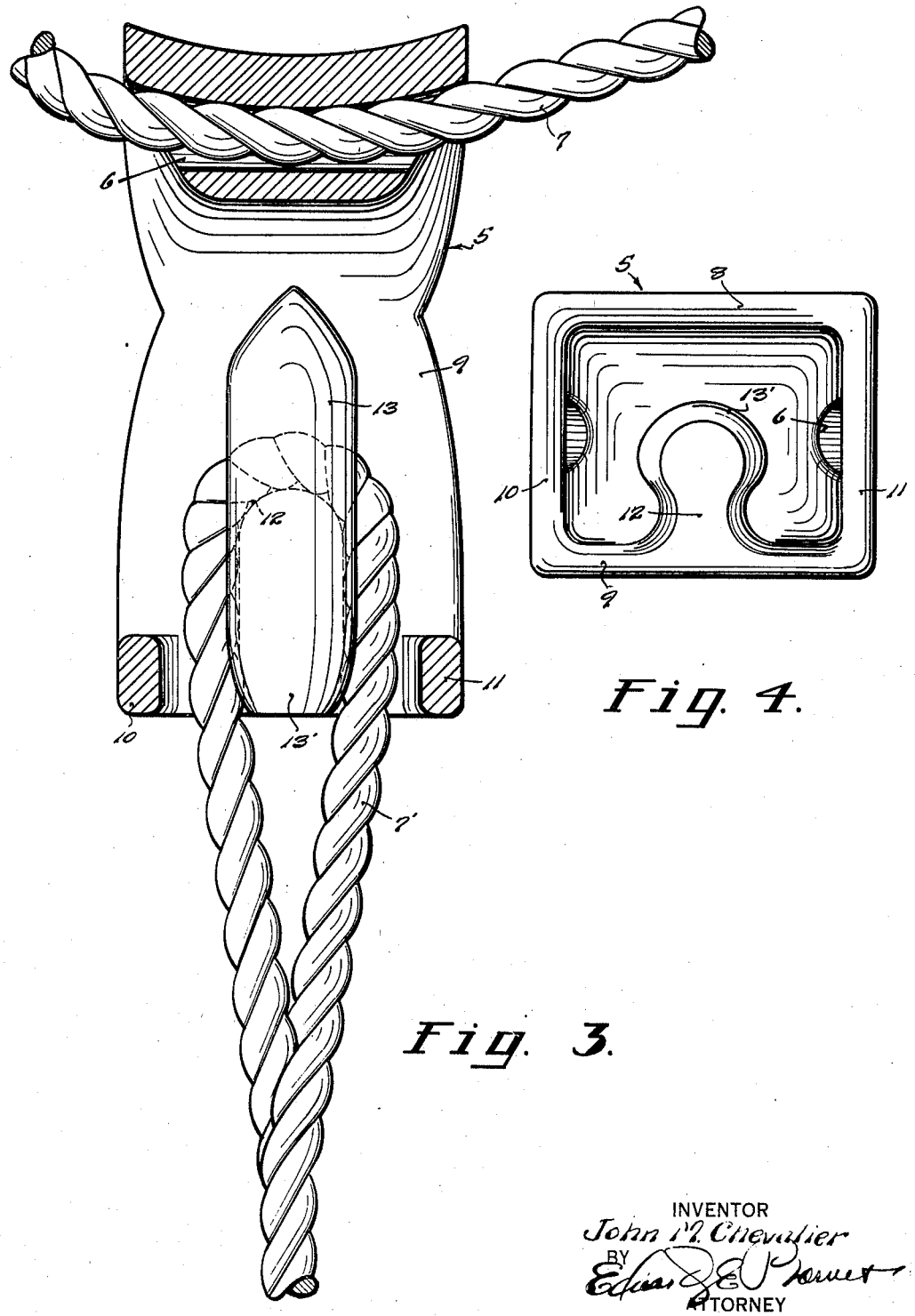
Fig. 3 is a horizontal section on line 3—3 of Fig. 2 and indicating, fragmentarily, a cable as the same is applied to the hook.
Fig. 4 is a rear-end elevational view of the hook.

The numeral 5 indicates, generally, a coupling block embodying the advancements of the present invention and produced in one piece, usually forged or cast in steel. At one end of this block is provided a slip-sleeve produced with a transverse reeve-way 6 for the reception of the slip portion of a cable 7 characterized in that its free end is formed with an eye 7', the reeve-way being preferably convexed to permit ready slippage and to minimize wear.

Extending from this slip-sleeve are spaced-apart and relatively parallel head and base walls 8 and 9 joined at opposite sides of the block at the end thereof remote from the slip-sleeve by posts 10 and 11. Considering the block in rear-end elevation, these posts together with the head and base walls of the body and the hook proper which is carried on the longitudinal median line of the base wall defines a throat of inverted U-shape which, in the span between its facing walls, very slightly exceeds the diameter of the cable.

Said hook proper is formed with a root or shank 12 and a bill 13, the bill lying relatively intermediate the head and base walls and being characterized in that the same is prolonged forwardly on a generally rectilineal axis from a butt-part 13' which surmounts the shank, the bill being increased in its width from the width of the shank and having its heel part tapered inwardly to a point whereat the rear end of the bill corresponds in its width to the span between the cable-seating sides of the hook shank. The toe of the bill, which is to say the forward end of the same, runs to a point generally defining the horizontal center of the bill.

In use, the cable eye is passed through the U-throat over the butt-part of the bill and forwardly therefrom into abutting engagement with the back wall of the slip-sleeve, whereupon the eye is canted downwardly and retracted to lodge the eye under the bill while simultaneously springing the sides of the eye over the bellied butt-part of the bill, the contraction of the eye causing the same to hug the shank. In disengaging, the operator forces the eye forwardly in the block. The resulting wedge action of the shank as the same is carried into the converging throat of the eye spreads the sides of the latter to permit the forward end of the eye to be canted upwardly past the toe of the bill. Slight retraction clears the eye from its hooked position while still restraining the cable between the bill and the guard-forming head wall of the block, from which position the cable is readily disengaged from the block without the necessity of grasping the live end.

The nature and advantages of the invention are readily understood from the foregoing description referring specifically to my illustrated embodiment, but inasmuch as numerous modifications may be resorted to well within the spirit of the invention it is my intention that no limitations be implied and that the hereto annexed claims be given an interpretation commensurate with the state of the advance in the art.

What I claim is:

1. A logging hook for use with a cable having an eye at its free end, comprising a block providing a box-like body open at one end and, within the box chamber of said body and unitary with the block, having an eye-engaging hook formed with a supporting shank and a bill surmounting the shank and directed forwardly from the end opening, said end opening being marginally compassed.

2. A logging hook for use with a cable having an eye at its free end, comprising a block formed with a box-like body open at one end and, within the box chamber of said body and unitary with the block, having an eye-engaging hook formed with a supporting shank and a bill surmounting the shank and carried forwardly from the end opening on an approximate rectilineal line generally corresponding to the longitudinal center line of the body.

3. The defined hook of claim 2 wherein the end opening, defined at the inside by the shank and bill of the hook and at the outside by side and head walls of the body, is of an inverted U-shape of which the span between the facing surfaces slightly exceeds the diameter of the cable.

4. A logging hook for use with a choker cable having an eye at its free end, comprising a block formed at one end with a slip-sleeve and at the other end with a box-like body having an end opening and, within the box chamber of the body and unitary with the block, with a hook providing a supporting shank and a bill surmounting the shank and directed forwardly from the end opening.

5. A logging hook for use with a choker cable having an eye at its free end, comprising a block formed at one end with a slip-sleeve and at the other end with an open-end box-like body and, within the box chamber of the body and unitary with the block, having a hook providing a supporting shank and a bill surmounting the shank and directed forwardly from the end opening, said bill being bellied outwardly beyond the side limits of the shank.

6. A logging hook for use with a choker cable having an eye at its free end: comprising a block formed at one end with a slip-sleeve and at the other end with an open-end box-like body of which the box chamber is defined by head and base walls extending rearwardly from the slip-sleeve and joined at the end thereof remote from the slip-sleeve by side posts lying at the edge limits of the body, and a hook carried in the box chamber having a shank unitary with the base wall and a bill surmounting the shank and forwardly directed from the end opening to occupy a plane paralleling, or nearly paralleling, the head wall of the body, the bill of the hook being bellied outwardly beyond the side limits of the shank.

7. The logging hook of claim 6 wherein the shank-surmounting heel part of the bill tapers inwardly to a width generally corresponding to the span between the cable-seating sides of the shank.

8. The logging hook of claim 6 wherein the toe part of the bill runs to a point located relatively on the axial line of the bill.

JOHN M. CHEVALIER.